United States Patent Office 3,094,532
Patented June 18, 1963

---

3,094,532
N-(AMINOALKYL)-PIPERIDYL ESTERS
Frederick F. Blicke, Ann Arbor, Mich., and John H. Biel, Milwaukee, Wis.; said Blicke assignor to Regents of the University of Michigan, Ann Arbor, Mich., a corporation of Michigan; said Biel assignor to Lakeside Laboratories, Inc., Milwaukee, Wis., a corporation of Delaware
No Drawing. Filed Sept. 9, 1960, Ser. No. 54,863
7 Claims. (Cl. 260—268)

This invention relates to derivatives of piperidine. More particularly, this invention is concerned with novel esters of N-substituted piperidinols, processes of producing such compounds and uses for the compounds.

According to the present invention there are provided novel dicyclic acetic acid esters of N-(aminoalkyl)-3 or 4-piperidinols. These esters have the formula

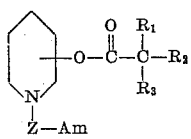

wherein $R_1$ is a member of the group consisting of hydrogen, hydroxy, amino, lower alkoxy such as methoxy and ethoxy, acyloxy and particularly such groups from lower aliphatic monocarboxylic acids such as formyl, acetyl and propionyl, and halogen including chlorine and bromine, $R_2$ is a member of the group consisting of phenyl, thienyl and nuclear substituted phenyl groups containing at least one substituent of the group consisting of halogen, lower alkyl, lower alkoxy, amino, nitro and lower alkylenedioxy groups, $R_3$ is a member of the group consisting of phenyl, nuclear substituted phenyl groups containing at least one substituent of the group consisting of halogen, lower alkyl, lower alkoxy, amino, nitro and lower alkylenedioxy, cycloalkyl groups including cyclopropyl, cyclobutyl, cyclopentyl, cyclohexyl and cycloheptyl, cycloalkenyl groups such as cyclopropenyl, cyclobutenyl, cyclopentenyl and cyclohexenyl, furyl, thienyl and pyridyl, Z is a straight or branched alkylene of 2 to 10, and advisably of 2 to 5, carbons and Am represents a di-lower alkyl amino such as dimethylamino or diethylamino, morpholino, pyrrolidino, piperidino, a 4-lower alkyl piperazino such as 4-methylpiperazino or a 4-(hydroxy lower alkyl)-piperazino such as 4-(beta-hydroxyethyl)-piperazino. There are also provided by this invention acid addition and quaternary ammonium salts of the esters.

These compounds can be produced by reacting a 3 or 4-hydroxypiperidine with an N,N-disubstituted amino alkyl halide to produce an intermediate 1-(disubstituted aminoalkyl)-3 or 4-hydroxypiperidine which, upon reaction with a dicyclic acetic acid ester gives the desired dicyclic acetic acid ester of 1-(disubstituted amino alkyl)-3 or 4-hydroxy piperidine. This process can be represented as follows:

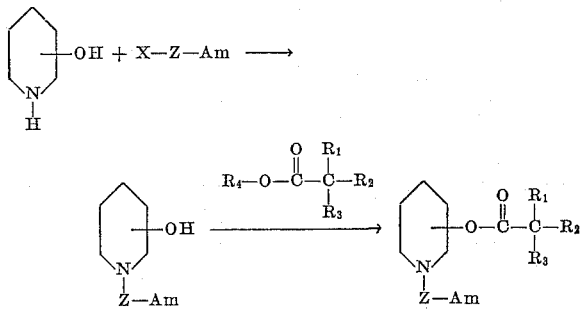

wherein X is a reactive halogen such as chlorine, bromine or iodine, $R_4$ is a lower alkyl such as methyl, ethyl or propyl, and Z, Am, $R_1$, $R_2$ and $R_3$ have the significance assigned above.

Either 3-hydroxypiperidine or 4-hydroxypiperidine can be used in the first step of the process. A 2-hydroxypiperidine does not appear to exist.

Some of the disubstituted aminoalkyl halides which can be used in the reaction are dimethylaminoethyl chloride, 3-(diethylamino)-propyl bromide, diisopropylaminoethyl chloride, 2-morpholinoethyl chloride, 4-(4-methylpiperazino)-butyl chloride, 3-piperidinopropyl chloride, 2-[4-(2-hydroxyethyl)-piperazino] ethyl chloride and 3-morpholinopropyl chloride.

The reaction between the 3 or 4-hydroxypiperidine and the disubstituted aminoalkyl halide is readily effected by bringing the reactants together in the presence of an inert liquid reaction medium such as ethanol, propanol, toluene, benzene, xylene or hexane. A base such as triethylamine or sodium bicarbonate is included in the reaction mixture to neutralize the hydrohalide formed during the reaction. The mixture is heated moderately such as up to the reflux temperature to promote the reaction and advance it toward completion. Usually, from about 4 to 10 hours are sufficient to essentially complete the reaction. After the reaction is terminated the reaction mixture can be filtered and the filtrate evaporated under reduced pressure to first distill off the solvent and then the product.

Some of the disubstituted aminoalkyl-3 or 4-hydroxypiperidines produced in this way are N-(3-dimethylaminopropyl)-3-hydroxypiperidine, N-(2-morpholinoethyl)-3-hydroxypiperidine, N - (4 - piperazinobutyl) - 4 - hydroxypiperidine, N - (2 - piperidinopropyl) - 3 - hydroxypiperidine, N - [gamma - (4 - methylpiperazino)-propyl] - 3 - hydroxypiperidine, N - [beta - (4 - methylpiperazino) - ethyl] - 3 - hydroxypiperidine, N - (beta-dimethylaminoethyl) - 3 - hydroxypiperidine, N - (beta-pyrrolidinoethyl) - 4 - hydroxypiperidine and N - (2-dimethylaminoethyl)-4-hydroxypiperidine.

In the second step of the process dicyclic acetic acids such as diphenylacetic acid, alpha-chlorodiphenylacetic acid, alpha-acetoxydiphenylacetic acid, alpha-methoxydiphenylacetic acid, alpha-aminodiphenylacetic acid, phenylcyclohexylacetic acid, phenylcyclopentylacetic acid, phenyl 2-thienyl acetic acid, phenylcyclohexyl glycolic acid, phenylcyclopentyl glycolic acid, phenyl 2-thienyl glycolic acid, benzilic acid, phenylcyclopentenyl-glycolic acid, alpha-aminophenylcyclohexylacetic acid, alpha-formyloxyphenylcyclopentylacetic acid, phenyl-furylacetic acid, phenyl 4-pyridyl acetic acid, di-(2-thienyl) acetic acid and 2-thienyl furyl acetic acid can be used in the form of lower alkyl esters, and especially the methyl, ethyl or propyl esters.

The reaction between the 1-(disubstituted aminoalkyl)-3 or 4-hydroxypiperidine and the dicyclic acetic acid ester can be effected by bringing the reactants together in an inert liquid reaction medium and advisably one which has a boiling point above that of the alcohol formed as a by-product in the reaction. This permits reflux of the reaction mixture and separation of the more volatile alcohol which facilitates bringing the reaction to completion. Solvents such as petroleum ether, n-heptane, toluene or xylene are suitable. There is advisably added to the reaction mixture an ester interchange promoter such as a sodium-lower alkoxide like sodium ethoxide, sodium hydride, lithium hydride, lithium amide or sodamide. After the reaction is terminated the product can be recovered by conventional procedures.

Some of the esters produced in this way are:

N-(3-dimethylaminopropyl)-3-piperidyl diphenylacetate,
N-(2-dimethylaminoethyl)-3-piperidyl benzilate, N-(3-dimethylaminopropyl)-3-piperidyl benzilate,
N-(2-piperidinoethyl)-3-piperidyl benzilate,
N-(2-morpholinoethyl)-3-piperidyl benzilate,
N - [gamma - (4 - methylpiperazino)-propyl]-3-piperidyl benzilate,
N - [beta - (4 - methylpiperazino)-ethyl]-3-piperidyl benzilate,
N - (3 - dimethylaminopropyl)-4-piperidyl phenylcyclopentylglycolate,
N - [beta-(4-methylpiperazino)-ethyl]-4-piperidyl phenylcyclohexylglycolate,
N - [beta-(4-methylpiperazino)-ethyl]-4-piperidyl alpha-chlorodiphenylacetate,
N-[beta-4-methylpiperazino)-ethyl]-4-piperidyl diphenylacetate,
N-[beta-(4-methylpiperazino)-ethyl] - 4 - piperidyl benzilate,
N - [beta-(4-methylpiperazino)-ethyl]-4-piperidyl phenylcyclopentylglycolate,
N - [beta-(4-methylpiperazino)-ethyl]-4-piperidyl phenylcyclopentenyl glycolate,
N-(2-morpholinoethyl)-3-piperidyl alpha-acetoxydiphenylacetate,
N-(3-pyrrolidinopropyl)-3-piperidyl alpha-aminophenylcyclohexylacetate,
N-(2-dimethylaminoethyl) - 3 - piperidyl phenyl 2-thienyl glycolate,
N - (2-diethylaminoethyl)-3-piperidyl phenylfurylacetate and
N-(2-morpholinoethyl)-4-piperidyl phenyl 3-pyridyl glycolate.

Acid addition salts of these compounds and the intermediate piperidinols can be produced by contacting the base with a suitable inorganic or organic acid such as hydrochloric, sulfuric, hydrobromic, phosphoric, maleic, acetic, citric, picric, succinic and tartaric and complex acids such as penicillin.

Quaternary ammonium salts of the eters and intermediate piperidinols can also be produced by reaction with an alkylating agent such as a lower alkyl halide such as methyl chloride, ethyl bromide or a di-lower alkyl sulfate such as diethyl sulfate, or an aryl substituted alkylating agent such as phenyl-lower alkyl halides including benzyl chloride and phenethyl bromide, and methyl paratoluenesulfonate.

The compounds of this invention, that is the dicyclic acetic acid esters of N-(aminoalkyl)-3 or 4-piperidinols have antispasmodic properties but are devoid of the psychotomimetic properties possessed by the N-(lower alkyl) piperidyl glycolate esters. In addition, these new derivatives produce mild tranquilization and skeletal muscle relaxation in animals and are also possible calming agents. The dual activity of spasmolysis and calming action makes the compounds particularly significant for possible use in the treatment of high-strung ulcer patients.

Although it is contemplated that these compounds will have their primary utility in the treatment of animals and humans, it is also obvious that the compounds have pharmacological utility in screening other compounds for similar activity or for opposing action.

The compounds can be administered to animals and humans in the form of pure, undiluted esters. However, to achieve a more suitable size to dosage relationship, it is advisable to combine the active compounds with a suitable pharmaceutical carrier. Either liquid or solid carriers can be used. The preferred liquid carrier is water since it is inexpensive, readily sterilized and solubilizes the esters in the form of acid addition salts.

With solid pharmaceutical carriers such as talc, sugar or starch the mixture can be used as powders or used to fill capsules. Tablets can also be produced by the use of binders, lubricating agents and disintegrating agents in conjunction with the principal solid carrier.

For therapeutic purposes it is advisable to employ the esters in the form of nontoxic acid addition salts. The oral route of administration is preferred.

Unit dosage forms such as tablets and capsules can contain any suitable amounts of one or more of the active esters but generally they will contain from 5 to 60% by weight of the esters.

The following examples are presented to illustrate the production of specific compounds within the scope of this invention.

EXAMPLE 1

*1-(2-Dimethylaminoethyl)-3-Hydroxypiperidine and Dihydrochloride*

2-dimethylaminoethyl chloride hydrochloride (14.5 g., 0.1 mole), dissolved in 160 ml. of 90% ethanol, was added, dropwise, to a stirred, refluxing mixture of 10.1 g. (0.1 mole) of 3-hydroxypiperidine, 25.2 g. (0.3 mole) of sodium bicarbonate and 50 ml. of ethanol. The mixture was refluxed for 10 hours, cooled and filtered. The solvent was removed under reduced pressure on a steam-bath and the residue was distilled; B.P. 140°–142° C. (30 mm.); yield 5.9 g. (34%).

*Anal.*—Calcd. for $C_9H_{20}ON_2$: C, 62.74; H, 11.70. Found: C, 62.96; H, 11.81.

The dihydrochloride, prepared in ether, was recrystallized from 75% ethanol-ether; M.P. 257° C. (dec.).

EXAMPLE 2

*1-(3-Dimethylaminopropyl)-3-Hydroxypiperidine and Dihydrochloride*

3-dimethylaminopropyl chloride (31.6 g., 0.2 mole), dissolved in 300 ml. of 90% ethanol, was added, dropwise, to a stirred refluxing mixture of 20.2 g. (0.2 mole) of 3-hydroxypiperidine, 50.4 g. (0.6 mole) of sodium bicarbonate and 75 ml. of 95% ethanol. The mixture was refluxed for 18 hours, cooled and filtered. The solvent was removed under reduced pressure on a steam-bath and the residue was distilled; B.P. 149° C. (24 mm.); yield 25.2 g. (68%).

The dihydrochloride, prepared in ether, melted at 228°–229° C. (dec.) after recrystallization from absolute ethanol.

*Anal.*—Calcd. for $C_{10}H_{24}ON_2Cl_2$: C, 46.33; H, 9.33; Cl, 27.36. Found: C, 45.94; H, 9.25; Cl, 27.09.

EXAMPLE 3

*1-[3-(4-Methylpiperazino)-Propyl]-3-Hydroxypiperidine*

3-(4-methylpiperazino)-propyl chloride dihydrochloride (19.7 g., 0.08 mole), dissolved in 250 ml. of 85% ethanol, was added, dropwise, to a stirred, refluxing mixture of 8.1 g. (0.08 mole) of 3-hydroxypiperidine, 20.2 g. (0.24 mole) of sodium bicarbonate and 50 ml. of 95% ethanol. The mixture was refluxed for 15 hours, cooled and filtered. The solvent was removed under reduced pressure on a steam-bath and the residue was dissolved in 100 ml. of ether. After filtration, the solvent was removed and the residue was distilled; B.P. 140°–141° C. (0.2 mm.); yield 10.1 g. (52%).

*Anal.*—Calcd. for $C_{13}H_{27}ON_3$: C, 64.68; H, 11.28. Found: C, 64.39; H, 11.34.

The tripicrate, prepared in ethanol, was recrystallized from aqueous acetone and then from water; M.P. 230°–233° C. (dec.).

*Anal.*—Calcd. for $C_{31}H_{36}O_{22}N_{12}$: C, 40.09; H, 3.91. Found: C, 40.18; H, 3.88.

EXAMPLE 4

*Diphenylacetic Acid Ester of 1-(2-Dimethylaminoethyl)-3-Hydroxypiperidine Dihydrochloride*

A mixture of 6.9 g. (0.04 mole) of 1-(2-dimethylaminoethyl)-3-hydroxypiperidine, 9.1 g. (0.04 mole) of methyl diphenylacetate, a solution of sodium methylate which had been prepared from 0.15 g. of sodium and 3 ml. of absolute methanol, and 75 ml. of petroleum ether (B.P. 90°–100° C.) was refluxed in a 300 ml. flask fitted with a Dean and Stark distilling receiver and a reflux condenser until the calculated amount of methanol had been collected. The cold mixture was diluted with 100 ml. of ether and washed with water. It was then extracted with dilute hydrochloric acid. The aqueous extract was made basic with solid potassium carbonate and extracted with ether. The extract was dried over magnesium sulfate and treated with ethereal hydrogen chloride whereupon the dihydrochloride precipitated. It was recrystallized from aqueous isopropyl alcohol; yield 9.9 g. (60%); M.P. 222–223° C. (dec.).

*Anal.*—Calcd. for $C_{23}H_{32}O_2N_2Cl_2$: C, 62.86; H, 7.34; Cl, 16.14. Found: C, 62.74; H, 7.49; Cl, 16.28.

EXAMPLE 5

*Benzilic Acid Ester of 1-(3-Dimethylaminopropyl)-3-Hydroxypiperidine Dihydrochloride*

A mixture of 9.3 g. (0.05 mole) of 1-(3-dimethylaminopropyl)-3-hydroxypiperidine, 12.1 g. (0.05 mole) of methyl benzilate, a solution of sodium methylate which had been prepared from 0.15 g. of sodium and 3 ml. of absolute methanol, and 75 ml. of petroleum ether (B.P. 90°–100° C.) was refluxed in a 300 ml. flask fitted with a Dean and Stark distilling receiver and a reflux condenser until the calculated amount of methanol was collected. The cold mixture was diluted with 100 ml. of ether and then washed with water. After extraction with dilute hydrochloric acid, the aqueous extract was made basic with solid potassium carbonate and extracted with ether. The extract was dried over magnesium sulfate and then treated with ethereal hydrogen chloride. The precipitated dihydrochloride was recrystallized from aqueous ethanol; yield 13.4 g. (57%); M.P. 213° C. (dec.).

*Anal.*—Calcd. for $C_{24}H_{34}O_3N_2Cl_2$: C, 61.40; H, 7.30; Cl, 15.10. Found: C, 61.74; H, 7.43; Cl, 15.06.

EXAMPLE 6

*Benzilic Acid Ester of 1-[3-(4-Methylpiperazino)-Propyl]-3-Hydroxypiperidine Trihydrochloride*

A mixture of 8.5 g. (0.035 mole) of 1-[3-(4-methylpiperazino)-propyl]-3-hydroxypiperidine, 8.6 g. (0.035 mole) of methyl benzilate, a solution of sodium methylate which had been prepared from 0.15 g. of sodium and 3 ml. of absolute methanol and 75 ml. of petroleum ether (B.P. 90°–100° C.) was refluxed in a 300 ml. flask fitted with a Dean and Stark distilling receiver and a reflux condenser until the calculated amount of methanol was collected. The mixture was cooled, 100 ml. of ether was added and the mixture was washed several times with water. It was then extracted with dilute hydrochloric acid. The aqueous extract was made basic with solid potassium carbonate and extracted with ether. After the extract had been dried over magnesium sulfate, it was treated with ethereal hydrogen chloride. The precipitated salt was recrystallized from methanol-acetone; yield 10.3 g. (53%); M.P. 255°–256° C. (dec.).

*Anal.*—Calcd. for $C_{27}H_{40}O_3N_3Cl_3$: C, 57.80; H, 7.01; Cl, 18.96. Found: C, 58.25; H, 7.25; Cl, 18.87.

Various changes and modifications of the invention can be made and, to the extent that such variations incorporate the spirit of this invention, they are intended to be included within the scope of the appended claims.

What is claimed is:

1. N-(2-dimethylaminoethyl)-3-piperidyl diphenylacetate.
2. N-(di-lower alkyl-amino-lower alkyl) - 3 - piperidyl diphenylacetate.
3. N-(3-dimethylaminopropyl)-3-piperidyl benzilate.
4. N-(di-lower alkyl-amino-lower alkyl)-3-piperidyl benzilate.
5. N-[3-(4-methylpiperazino)-propyl]-3-piperidyl benzilate.
6. A compound of the formula

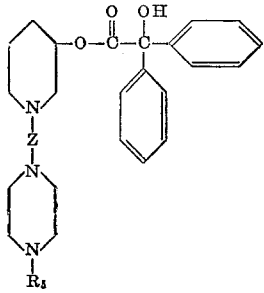

wherein Z is an alkylene of 2 to 10 carbons and $R_5$ is a lower alkyl.

7. A member of the group consisting of compounds of the formula

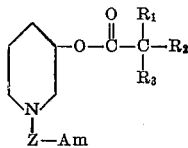

and

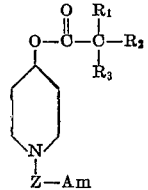

and non-toxic pharmaceutically acceptable acid addition salts thereof and quaternary ammonium salts thereof of the group consisting of those formed with lower alkyl halides, di-lower alkyl sulfates, phenyl-lower alkyl halides and methyl paratoluenesulfonate, wherein $R_1$ is a member of the group consisting of hydrogen, hydroxy, amino, lower alkoxy, halogen and acyloxy groups of the formula

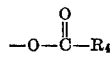

wherein $R_4$ is a lower alkyl, $R_2$ is a member of the group consisting of thienyl, phenyl and phenyl groups containing at least one substituent of the group consisting of halogen, lower alkyl, lower alkoxy, amino, nitro and lower alkylenedioxy groups, $R_3$ is a member of the group consisting of phenyl and phenyl groups containing at least one substituent of the group consisting of halogen, lower alkyl, lower alkoxy, amino, nitro and lower alkylenedioxy groups, cycloalkyl groups having three to seven carbons in the ring, cycloalkenyl groups having three to six carbons in the ring, furyl, thienyl and pyridyl, Z is an alkylene of two to ten carbons and Am is a member of the group consisting of di-lower alkyl amino, morpholino, pyrrolidino, piperidino, 4-lower alkyl piperazino and 4-(hydroxy lower alkyl)-piperazino.

References Cited in the file of this patent

UNITED STATES PATENTS

| | | |
|---|---|---|
| 2,903,454 | Richter et al. | Sept. 8, 1959 |
| 2,908,683 | Jacob et al. | Oct. 13, 1959 |
| 2,919,272 | Craig | Dec. 29, 1959 |
| 2,956,059 | Renz et al. | Oct. 11, 1960 |

OTHER REFERENCES

Anderson et al.: J. Chem. Soc. (London) (1956), pages 4088–91.